US012791698B2

(12) United States Patent
Felemban et al.

(10) Patent No.: US 12,791,698 B2
(45) Date of Patent: Nov. 10, 2026

(54) SMART-SENSING SYSTEMS FOR INTEGRITY ASSESSMENT OF INACCESSIBLE ASSETS

(71) Applicant: SAUDI ARABIAN OIL COMPANY, Dhahran (SA)

(72) Inventors: Amjad Felemban, Dhahran (SA); Ibrahim Alsalamah, Dhahran (SA); Fadl Abdellatif, Dhahran (SA); Ali Alrasheed, Dhahran (SA); Ali Shehri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 245 days.

(21) Appl. No.: 18/818,217

(22) Filed: Aug. 28, 2024

(65) Prior Publication Data

US 2026/0063787 A1 Mar. 5, 2026

(51) Int. Cl.
*G01S 13/75* (2006.01)
*G01S 13/88* (2006.01)

(52) U.S. Cl.
CPC .......... *G01S 13/758* (2013.01); *G01S 13/885* (2013.01)

(58) Field of Classification Search
CPC ......... G01S 13/758; G01S 13/885; G01S 7/03
See application file for complete search history.

(56) References Cited

U.S. PATENT DOCUMENTS

| | | | |
|---|---|---|---|
| 8,536,983 | B2 | 9/2013 | Harasti et al. |
| 8,902,302 | B2 | 12/2014 | Garvey, III et al. |
| 9,645,237 | B2 | 5/2017 | Stolarczyk |

(Continued)

FOREIGN PATENT DOCUMENTS

| | | | |
|---|---|---|---|
| KR | 101793830 | B1 | 11/2017 |
| KR | 20200079604 | A | 7/2020 |

(Continued)

OTHER PUBLICATIONS

Mathieu Le Breton, et al., Dense and long-term monitoring of earth surface processes with passive RFID—a review, Earth-Science Reviews, vol. 234, 2022.

(Continued)

*Primary Examiner* — Timothy A Brainard
*Assistant Examiner* — Bongani Jabulani Mashele
(74) *Attorney, Agent, or Firm* — Vorys, Sater, Seymour and Pease LLP

(57) ABSTRACT

A smart-sensing radio frequency identification (RFID) patch for assessing a status of an inaccessible asset includes a flexible substrate operable to bend or flex to be secured about an exterior surface of the inaccessible asset, an integrated circuit embedded within the flexible substrate and communicably coupled to a plurality of electrical connections, a plurality of micro-electromechanical systems (MEMS) sensors communicably coupled to one or more of the electrical connections, the MEMS sensors operable to output signals denoting the status of the inaccessible asset, and one or more antennae communicably coupled to one or more of the electrical connections, wherein the antennae are operable to receive a high-power signal from an external source and emit a backscattering signal including the signals output by the MEMS sensors.

20 Claims, 5 Drawing Sheets

(56) References Cited

U.S. PATENT DOCUMENTS

| | | | |
|---|---|---|---|
| 11,442,134 | B1 | 9/2022 | Beigel |
| 2019/0236732 | A1 | 8/2019 | Speasl et al. |

FOREIGN PATENT DOCUMENTS

| | | | | |
|---|---|---|---|---|
| WO | 2015194911 A1 | 12/2015 | | |
| WO | WO-2017222271 A1 * | 12/2017 | ............... | G01V 9/00 |

OTHER PUBLICATIONS

Abdelnour A, et al., Passive Harmonic RFID System for Buried Assets Localization. Sensors. 2018; 18(11):3635.

Zhang, W. & Chang, Y. & Hao, Tong. (2016). Design of RF tags attaching to buried pipes for enhanced detection by GPR. 1-5. 10.1109/ICGPR.2016.7572622.

Ge, L., Zhang, C., Tian, G. et al. Current Trends and Perspectives of Detection and Location for Buried Non-Metallic Pipelines. Chin. J. Mech. Eng. 34, 97 (2021).

Preethichandra DMG, et al., Influence of Smart Sensors on Structural Health Monitoring Systems and Future Asset Management Practices. Sensors. 2023; 23(19):8279.

* cited by examiner

SMART-SENSING SYSTEMS FOR INTEGRITY ASSESSMENT OF INACCESSIBLE ASSETS

FIELD OF THE DISCLOSURE

The present disclosure relates generally to remote sensing methods, and more particularly to direct monitoring of buried, or otherwise inaccessible, hardware.

BACKGROUND OF THE DISCLOSURE

For many oil and gas and infrastructural applications, industrial assets can be deployed underground, underwater, within walls, and in other locations which are otherwise inaccessible to an operator. These inaccessible assets can include piping circuits and valve components that can be utilized in the transfer and control of fluids therethrough. After deployment within an inaccessible location, the general location of the inaccessible assets can be obfuscated over time. Accordingly, further operations in the area of the inaccessible assets, such as digging operations, can threaten the health and safety of the inaccessible assets, thus threatening the overall system.

As such, advances have been made for the remote detection of these inaccessible assets while in position. One such advance includes the application of radio frequency identification (RFID) components on or within the inaccessible assets. Thus, an operator can later provide a high-power signal in a direction of the inaccessible assets (e.g., into the ground for a buried asset) and receive a backscattering signal from the inaccessible RFID components. The high-power signal can be received by, and can electrically excite, the RFID components, which can in turn return an identifying signal as part of the backscattering signal returned to the operator. Therefore, the general location and identification of each inaccessible asset can be obtained without removing obstructions between the operator and the inaccessible asset. However, while conventional methods and systems can enable the detection/identification of inaccessible assets, to perform an inspection or health check on the inaccessible asset the interposing obstructions can necessitate direct access. As such, the performance of integrity checks on inaccessible assets can often require excavation of buried pipes or other intensive operations to enable access to these assets.

Accordingly, methods and systems are desirable for inspecting inaccessible assets without necessitating excavation, or otherwise removing obstructions interposing an operator and the inaccessible asset.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a smart-sensing radio frequency identification (RFID) patch for assessing a status of an inaccessible asset includes a flexible substrate operable to bend or flex to be secured about an exterior surface of the inaccessible asset, an integrated circuit embedded within the flexible substrate and communicably coupled to a plurality of electrical connections, a plurality of micro-electromechanical systems (MEMS) sensors communicably coupled to one or more of the electrical connections, the MEMS sensors operable to output signals denoting the status of the inaccessible asset, and one or more antennae communicably coupled to one or more of the electrical connections, wherein the antennae are operable to receive a high-power signal from an external source and emit a backscattering signal including the signals output by the MEMS sensors.

In another embodiment, a system for assessing a status of an inaccessible asset includes a smart-sensing radio frequency identification (RFID) patch including an integrated circuit, an antenna, and one or more micro-electromechanical systems (MEMS) sensors arranged on a flexible substrate, the smart-sensing RFID patch coupled to an inaccessible asset, and a ground-penetrating radar (GPR) trolley. The GPR trolley includes a conveyance means for traversing a ground in the vicinity of an inaccessible asset, a GPR emitter operable to emit a high-power signal receivable by the smart-sensing RFID patch, and a GPR receiver operable to receive a backscattering signal emitted by the smart-sensing RFID patch and including signals indicating the status of the inaccessible asset.

In a further embodiment, a method for assessing a status of an inaccessible asset includes conveying, via a conveyance means, a ground-penetrating radar (GPR) trolley along a ground surface in the vicinity of the inaccessible asset, emitting, via a GPR emitter of the GPR trolley, a high-power signal towards the inaccessible asset and a smart-sensing radio frequency identification (RFID) patch mounted thereon, transforming, via an integrated circuit and micro-electromechanical systems (MEMS) sensors of the smart-sensing RFID patch, the high-power signal to include signals of the MEMS sensors denoting the status of the inaccessible asset, and emitting, via the smart-sensing RFID patch, a backscattering signal including the signals of the MEMS sensors towards the GPR trolley. The method further includes receiving, via a GPR receiver of the GPR trolley, the backscattering signal including the signals of the MEMS sensors denoting the status of the inaccessible asset, and analyzing, via a computing device, the backscattering signal received by the GPR receiver to extract the status of the inaccessible asset from the backscattering signal.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
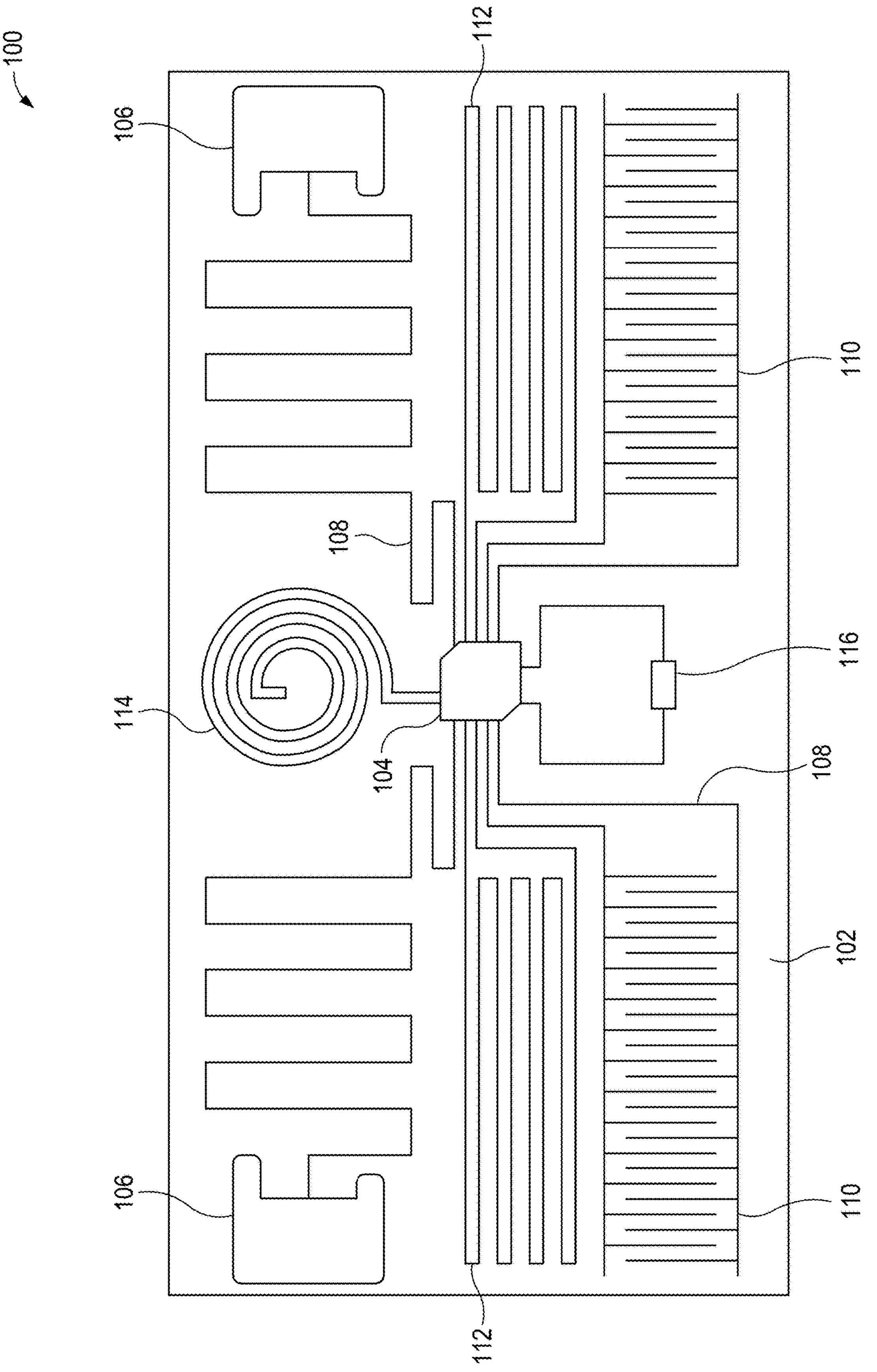
FIG. 1 is a schematic view of an example smart-sensing RFID patch for use in the remote monitoring of inaccessible assets.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to remote sensing methods, and more particularly to direct monitoring of buried, or otherwise inaccessible, hardware. The systems and methods disclosed herein include a combined use of ground-penetrating radar (GPR) and radio frequency identification (RFID) components for the direct monitoring of inaccessible assets. The RFID components can include smart-sensing RFID patches operable to receive a high-power GPR signal and return a backscattering signal including signals denoting an overall health of the inaccessible asset. In some embodiments, the smart-sensing RFID patches can include a plurality of micro-electromechanical systems (MEMS) sensors included therein. In these embodiments, the MEMS sensors can detect and signal a variety of property changes of the inaccessible assets, including, but not limited to, stresses, strains, vibrations, temperatures, heat fluxes, pressures, and any combination thereof.

The disclosed embodiments can include arrays of smart-sensing RFID patches, such that 3 or more, or 5 or more, smart-sensing RFID patches can be included on a single flexible substrate. In these embodiments, the arrays of smart-sensing RFID patches can be wrapped around an inaccessible asset to enable integrity checking from a variety of angles and locations. The arrays of smart-sensing RFID patches can further enable communication between the smart-sensing RFID patches to enable integrity checking from each smart-sensing RFID patch in a single excitation and backscattering. Through the use of the disclosed systems and methods, the health and integrity of inaccessible assets can be remotely assessed without necessitating excavation or obstruction-removal, while increasing speed and simplicity through the use of arrays of smart-sensing RFID patches able to be accessed from a variety of locations.

FIG. 1 is a schematic view of an example smart-sensing RFID patch 100 for use in the remote monitoring of inaccessible assets. The smart-sensing RFID patch 100 can include a flexible substrate 102 as a base layer thereof, such that the smart-sensing RFID patch 100 can be flexibly manipulated to bend, flex, or otherwise contour to a surface of an inaccessible asset. In some embodiments, the flexible substrate 102 can be a polymer film, such as a polyester of polycarbonate, polyvinyl chloride, or polyethylene terephthalate, a metal foil, an ultra-thin glass, a styrene, a phenol, paper, or a combination thereof. The flexible substrate 102 can be chosen based upon a desired mechanical strength or thermally-resistant property, such that the flexible substrate 102 can be selected on an application-by-application basis. The flexible substrate 102 can comprise a body of the smart-sensing RFID patch 100, such that other components can be included thereon, and can be sized according to the desired application. In some embodiments, the flexible substrate 102 can be provided with an adhesive material on a rear surface thereof for attachment to a surface of an inaccessible asset.

The smart-sensing RFID patch 100 can further include an integrated circuit 104 mounted to, or integrally formed with, the flexible substrate 102. The integrated circuit 104 can include a controller, a memory, and a microprocessor, such that all local data storage, input, output, and signal modifications can be performed within the integrated circuit 104 when electrically excited. In the illustrated embodiment, the smart-sensing RFID patch 100 utilizes a passive integrated circuit 104, wherein the smart-sensing RFID patch 100 and integrated circuit 104 lack a power source on the flexible substrate 102. Rather, the flexible substrate 102 includes one or more antennae 106 integrated therein, such that the antennae 106 can receive a high-power signal from an external source that can excite the smart-sensing RFID patch 100 and integrated circuit 104. In further embodiments, however, the smart-sensing RFID patch 100 can be use active RFID technology and can include a local power source for constant, or situational, powering.

The smart-sensing RFID patch 100 can include a plurality of electrical connections 108 embedded within the flexible substrate 102, such that electrical signals can be transported along the smart-sensing RFID patch 100. As seen in the illustrated embodiment, the electrical connections 108 can directly connect the integrated circuit 104 and the antennae 106. In these embodiments, the received energy of the high-power signal can travel from the antennae 106 and into the integrated circuit 104 to excite and activate operation of the smart-sensing RFID patch 100. During operation, the integrated circuit 104 can modulate the received high-power signal, and can output a backscattering signal to the antennae 106 for return to the external source.

The electrical connections 108 can be further seen to connect the integrated circuit 104 to a plurality of micro-electromechanical systems (MEMS) sensor patterns 110-114 embedded within the flexible substrate 102, each formed of a conductive wire or foil. In some embodiments, the smart-sensing RFID patch 100 can include a capacitance MEMS pattern 110, operable to detect both mechanical and thermal changes in the smart-sensing RFID patch 100 and inaccessible asset. The capacitance MEMS pattern 110 can be seen to include mechanical structures embedded in the flexible substrate 102, and the capacitance between the mechanical structures can be monitored compared to a baseline value. As the inaccessible asset, and in turn the flexible substrate 102 and smart-sensing RFID patch 100, are mechanically or thermally affected, an output value of the capacitance MEMS pattern 110 can directly measure the mechanical and thermal changes.

In some embodiments, the smart-sensing RFID patch 100 can further include a straight resistance MEMS pattern 112, operable to sense property variations selected from the group consisting of stresses, strains, pressures, deformations, and any combination thereof. The straight resistance MEMS pattern 112 can operate in similarly to a resistance strain gauge, such that deformation of the inaccessible asset and the flexible substrate 102 can alter a length and cross-sectional area of the straight resistance MEMS pattern 112. As the length and cross-sectional area of the straight resistance MEMS pattern 112 are changed, the resistance of the straight resistance MEMS pattern 112 accordingly alters the overall resistance thereof. The change in resistance measured within the straight resistance MEMS pattern 112 can be processed to measure the mechanical property variations discussed above.

In further embodiments, the smart-sensing RFID patch 100 can further include a spiral resistance MEMS pattern 114, operable to sense thermal variations of the flexible substrate 102 and inaccessible asset. The spiral resistance MEMS pattern 114 can utilize a well-known relationship between temperature and resistance to sense and monitor changes in temperature, heat flux, and other thermal properties of the inaccessible asset and flexible substrate 102. The spiral resistance MEMS pattern 114 can be used in the determination of a resistance thereof, and any increases in temperature or heat flux through the flexible substrate 102 can accordingly increase the resistance of the spiral resistance MEMS pattern 114. The changes in resistance values of the spiral resistance MEMS pattern 114 can be utilized to determine the corresponding change in temperature of the flexible substrate 102 and inaccessible asset.

As seen in the illustrated embodiment, each of the MEMS sensor patterns 110-114 can be directly connected to the integrated circuit 104 via the electrical connections 108. In the illustrated embodiment, the electrical connections 108 each independently connect to the integrated circuit 104, such that each MEMS sensor pattern 110-114 is connected to two electrical connections 108. In further embodiments, however, the MEMS sensor patterns 110-114 can be connected at a common bus on the smart-sensing RFID patch 100. The smart-sensing RFID patch 100 can further include a degradable connector 116 on a pair of electrical connections 108 wired into the integrated circuit 104. In some embodiments, the degradable connector 116 can be a chemically-reactive component which conducts electricity therethrough during normal operations of the smart-sensing RFID patch 100. However, in these embodiments, if the smart-sensing RFID patch 100 and degradable connector 116 come into contact with a specified chemical or chemical type, the degradable connector 116 can be dissolved, thus stopping electrical flow within the degradable connector 116. Accordingly, the integrated circuit 104 can detect and signal the loss of flow through the degradable connector 116, thus signaling that the smart-sensing RFID patch 100 has been exposed to a chemical. In some embodiments, the smart-sensing RFID patch 100 can be mounted on a buried pipeline carrying a fluid therethrough. As such, in these embodiments, the degradable connector 116 can signal damage or leaking of the buried pipeline, exposing the smart-sensing RFID patch 100 to the carried fluid. In further embodiments, the degradable connector 116 can be a bioresorbable electrical connection that can degrade and dissolve over a specified time or when exposed to a particular chemical. In further embodiments still, the degradable connector 116 can include a triggered release electrode derogator coating which can initiate degradation of the degradable connector 116 when exposed to certain environmental conditions.

Through the combination of an integrated circuit 104, one or more antennae 106, and a plurality of MEMS sensor patterns, such as 110-116, the smart-sensing RFID patch 100 can passively sense and monitor physical and thermal properties of an inaccessible asset remotely. The use of RFID and GPR technology can enable the excitement of the smart-sensing RFID patch 100 from a remote location and production of a backscattering signal including signals from each MEMS sensor pattern on the smart-sensing RFID patch 100. The smart-sensing RFID patch 100 can actively monitor a health of an inaccessible asset without excavation or removal of interposing materials.

Figure 2A:
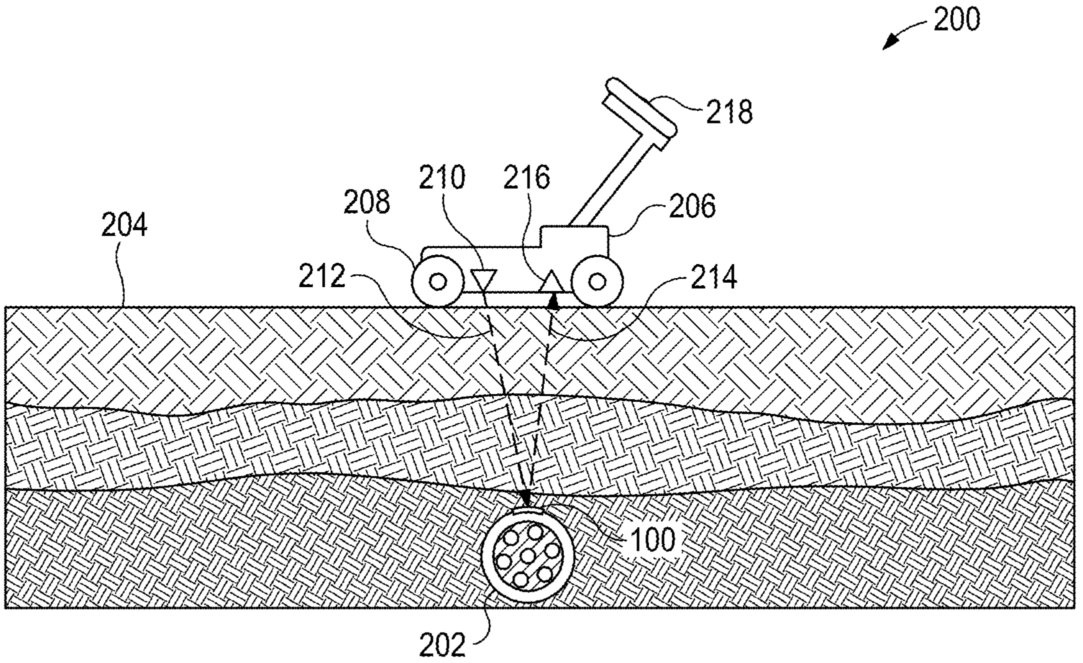
FIG. 2A illustrates an example GPR excitation and backscattering process for a smart-sensing RFID patch applied to an exterior of an inaccessible asset.

FIG. 2A illustrates an example system 200 for GPR excitation and backscattering with a smart-sensing RFID patch 100 applied to an exterior of an inaccessible asset 202. As shown in the illustrated embodiment, the smart-sensing RFID patch 100 has been mounted on or coupled to an external surface of the inaccessible asset 202, which can transport a series of fluid lines or cables below ground surface 204. As discussed above, the smart-sensing RFID patch 100 can be a passively sensing RFID patch, such that the smart-sensing RFID patch 100 lacks any discrete power sources included thereon. Rather, the system 200 utilizes a GPR trolley 206 that can traverse the ground surface 204 and remotely interface with the smart-sensing RFID patch 100. The GPR trolley 206 can include one or more conveyance means 208, such as a wheel and axle system shown in the illustrated embodiment, that can enable movement of the GPR trolley 206 across the ground surface 204.

The GPR trolley 206 can include a GPR emitter 210 mounted thereon and aimed in the direction of the ground surface 204 and smart-sensing RFID patch 100. The GPR emitter 210 can emit a high-power signal 212 constantly, or at set intervals, while traversing the ground surface 204, such that the GPR trolley 206 can excite the smart-sensing RFID patch 100 when approaching the location of the inaccessible asset 202. In some embodiments, the high-power signal 212 can be of sufficient power to penetrate mediums with dielectric factors of about 10 or greater, such as dry sand, wet clay, asphalt, or other materials. The high-power signal 212 can be received by one or more antennae 106 of smart-sensing RFID patch 100, as seen in FIG. 1, and can excite any circuitry included thereon. The high-power signal 212 can then be transformed or modulated by the smart-sensing RFID patch 100, which can emit a backscattering signal 214 from one or more of the antennae 106. The backscattering signal 214 including identifying information of the smart-sensing RFID patch 100 or inaccessible asset 202, as well as any sensor information from MEMS sensors included therein.

Accordingly, the GPR trolley 206 can further include a GPR receiver 216 mounted thereon and aimed in the direction of the ground surface 204 and smart-sensing RFID patch 100. As the excited smart-sensing RFID patch 100 emits the backscattering signal 214, the backscattering signal 214 can be received via the GPR receiver 216. The GPR receiver 216 can be in communication with a computing device 218, shown as a unit mounted on the GPR trolley 206 in the illustrated embodiment, which can process the backscattering signal 214. The computing device 218 can perform post-processing of the backscattering signal 214, visualize any extracted data, and can interface with an operator via a display of the computing device 218. The computing device 218 can parse the backscattering signal 214 to determine the identification information of the smart-sensing RFID patch 100 and inaccessible asset 202, and can further extract sensor information from the backscattering signal 214. The sensor information can include mechanical and thermal properties of the inaccessible asset 202 and smart-sensing RFID patch 100, such that an operator can directly monitor a health of the inaccessible asset 202 from above the ground surface 204. Through the use of ground-penetrating radar and the system 200, the inaccessible asset 202 can be assessed and monitored at a variety of depths without the need for excavation. In some embodiments, a plurality of the smart-sensing RFID patch 100 can be mounted along a length of the inaccessible asset 202 at set distance intervals. In these embodiments, the GPR trolley 206 can be conveyed along the length of the inaccessible asset 202 on the ground surface 204 to assess a health of the inaccessible asset 202 at multiple locations to obtain an overall health of the inaccessible asset 202.

Figure 2B:
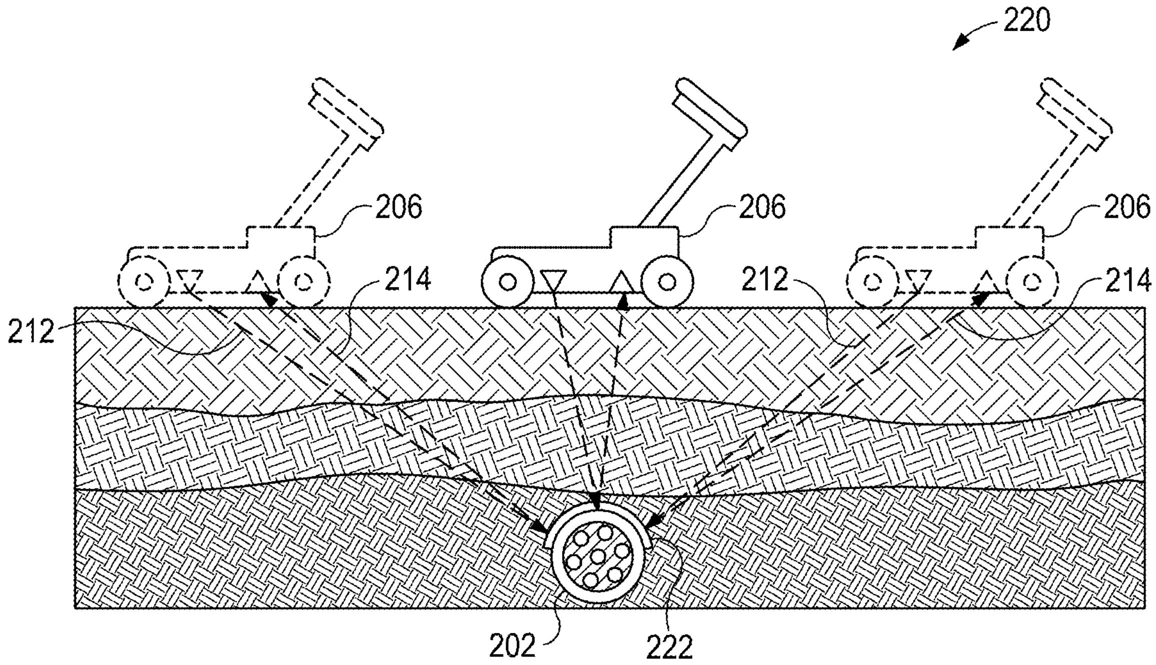
FIG. 2B illustrates an example GPR excitation and backscattering process for an array of smart-sensing RFID patches applied to an inaccessible asset.

FIG. 2B illustrates an example system 220 for GPR excitation and backscattering process with an array of smart-sensing RFID patches 222 applied to an inaccessible asset 202. While the system 200 of FIG. 2A included a singular smart-sensing RFID patch 100 mounted on the inaccessible asset 202, the system 220 includes an array of smart-sensing RFID patches 222 wrapped around an external surface of the inaccessible asset 202. The array of smart-sensing RFID patches 222 can be connected in series as a belt of smart-sensing RFID patches 100, or can be independently attached about the external surface. In embodiments wherein the array of smart-sensing RFID patches 222 is connected in series, the excitation of the array of smart-sensing RFID patches 222 by the high-power signal 212 can enable production of a backscattering signal 214 from a variety of locations on the ground surface 204, as opposed to directly above the inaccessible asset 202. Rather, as shown in the illustrated embodiments, the array of smart-sensing RFID patches 222 can receive a high-power signal 212 from a GPR trolley 206 at a variety of lateral locations away from the inaccessible asset 202, and can similarly return a backscattering signal 214 towards the lateral locations. As such, the use of array of smart-sensing RFID patches 222 can enable faster location and assessment of the inaccessible asset 202, and can further enable assessment of the inaccessible asset 202 at a variety of axial locations about the external surface.

Figure 3:
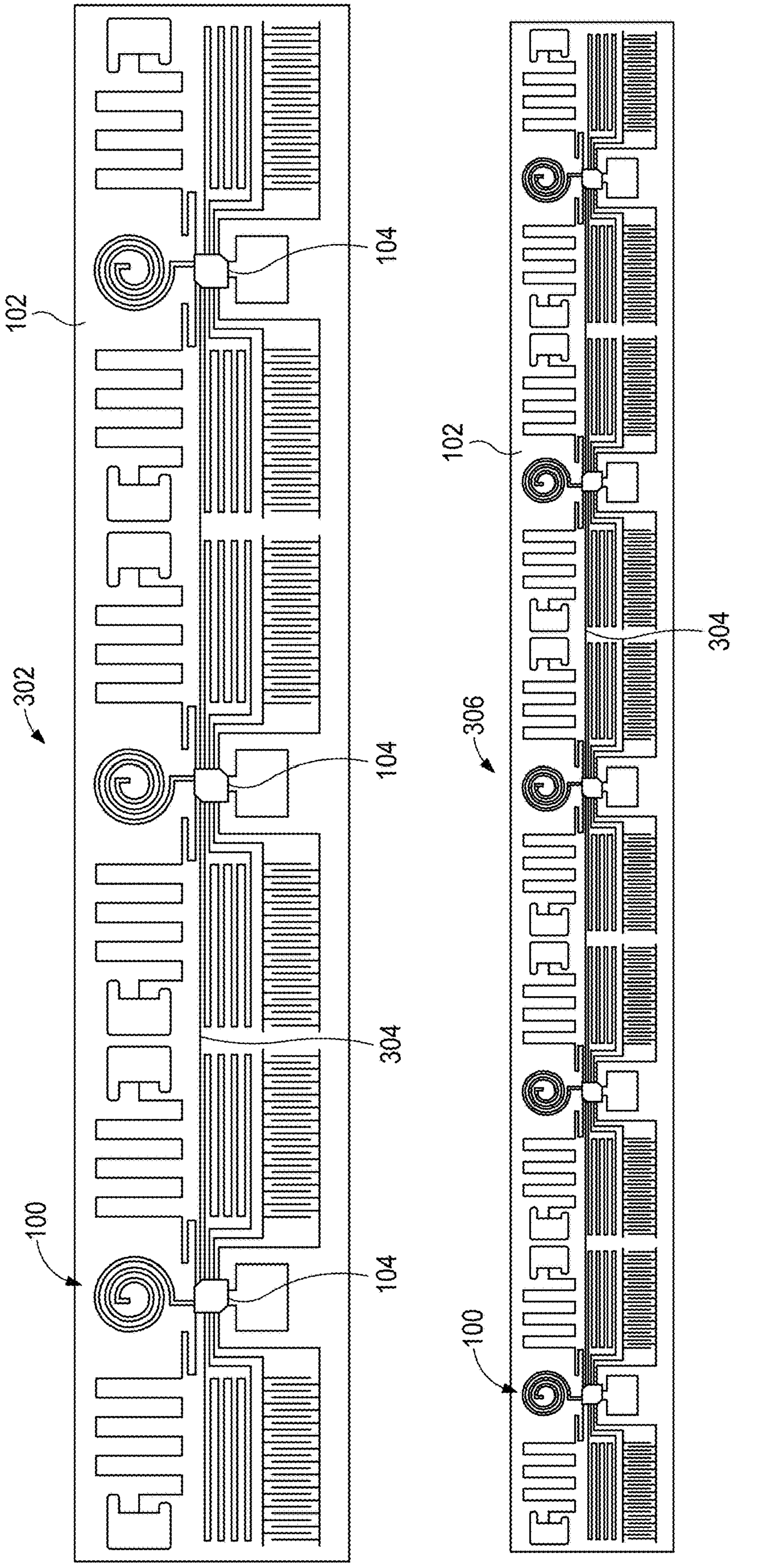
FIG. 3 illustrates example arrays of smart-sensing RFID patches on a singular flexible substrate for application on surfaces of inaccessible assets.

FIG. 3 illustrates example arrays of smart-sensing RFID patches 100 on a singular flexible substrate 102 for application on surfaces of inaccessible assets. A 3-patch belt 302 can be seen to include three distinct smart-sensing RFID patches 100 along a length of the flexible substrate 102. Each of the smart-sensing RFID patches 100 on the 3-patch belt 302 can include the same MEMS sensors, as shown, or can each include a variety of differing MEMS sensors. The 3-patch belt 302 can include a series connection 304 that can place each integrated circuit 104 in communication with the other integrated circuits 104 on the 3-patch belt 302. As such, when any of the smart-sensing RFID patches 100 are excited, all smart-sensing RFID patches 100 can output sensor readings and identifiers for the entire 3-patch belt 302. Similarly, the 5-patch belt 306 can include a series connection 304 that connects all smart-sensing RFID patches 100 thereon. It should be noted that, while only a 3-patch belt 302 and a 5-patch belt 306 are illustrated here, any number of smart-sensing RFID patches 100 can be connected in series or on a singular flexible substrate 102, without departing from the scope of this disclosure.

Figure 4:
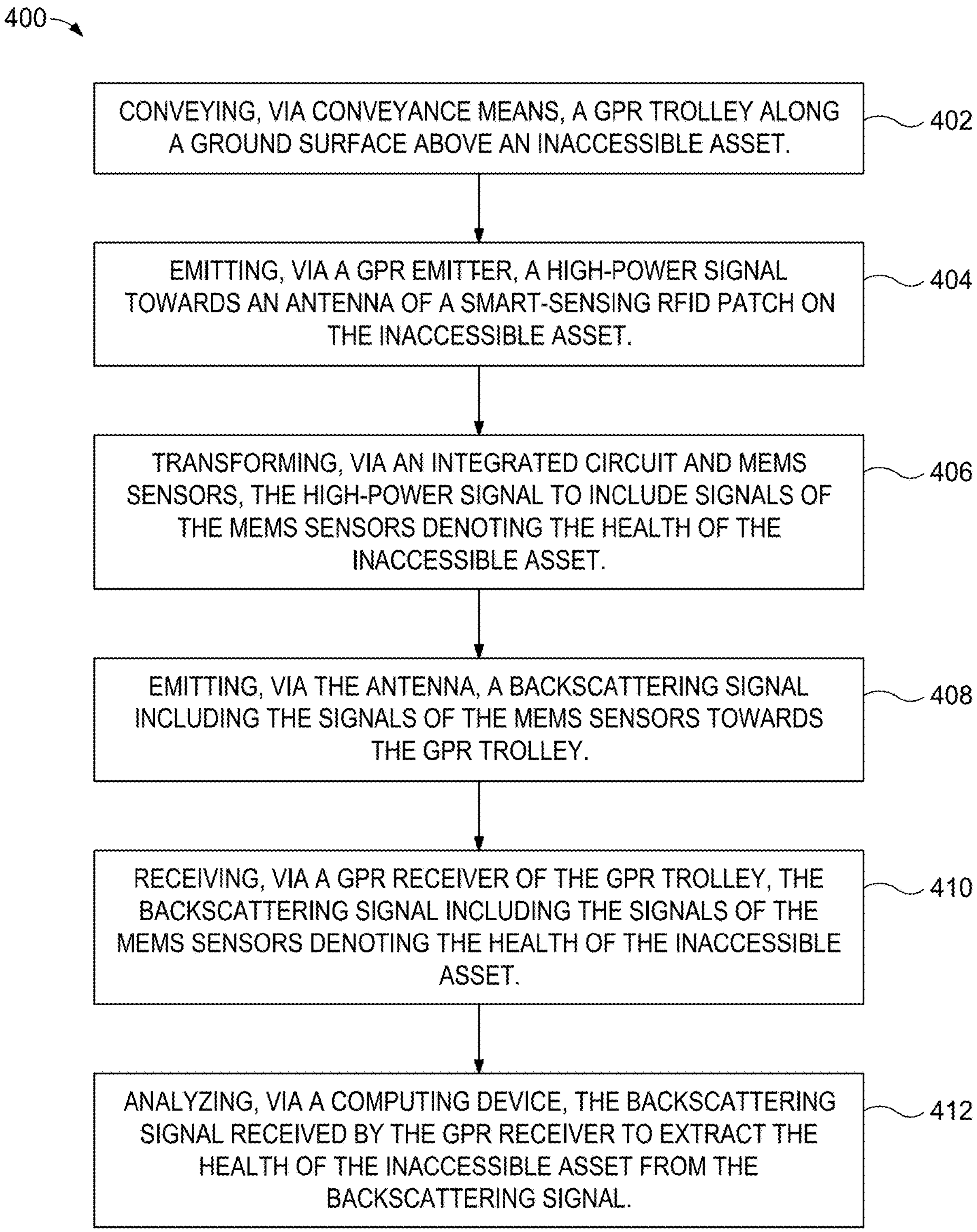
FIG. 4 illustrates an example method for assessing a status of a buried asset using GPR technology and smart-sensing RFID patches.

FIG. 4 illustrates an example method 400 for assessing a status of a buried asset using GPR technology and smart-sensing RFID patches. The method 400 can be implemented by the system 200 of FIG. 2A and the smart-sensing RFID patch 100 of FIG. 1. As such, reference may be made to the examples of FIG. 1-2B in the description of the method 400. The method 400 can begin at 402 with conveying, via a conveyance means (e.g., the conveyance means 208), a GPR trolley (e.g., the GPR trolley 206) along a ground surface (e.g., the ground surface 204). The ground surface and GPR trolley can be positioned directly above an inaccessible asset (e.g., the inaccessible asset 202), or can be laterally offset therefrom. The method 400 can further include emitting, via a GPR emitter (e.g., the GPR emitter 210), a high-power signal (e.g., the high-power signal 212) towards the inaccessible asset at 404. The inaccessible asset can include at least one smart-sensing RFID patch (e.g., the smart-sensing RFID patch 100) thereon for monitoring of a health of the inaccessible asset. At 404, the high-power signal can be further emitted towards an antenna (e.g., the antenna 106) of the smart-sensing RFID patch, such that an integrated circuit (e.g., the integrated circuit 104) thereon can be excited and operational. In some embodiments, the method 400 can begin with, and further include, mounting at least one smart-sensing RFID patch along a length of the inaccessible asset prior to covering or burying the inaccessible asset. In further embodiments, the method 400 can include mounting smart-sensing RFID patches at a set interval along the length of the inaccessible asset to monitor health of the inaccessible asset at multiple lateral locations.

The method 400 can further include transforming, via the integrated circuit and one or more MEMS sensors (e.g., the MEMS sensor patterns 110-114), the high-power signal to include one or more signals from the MEMS sensors at 406. In some embodiments, the high-power signal can be transformed to include information on mechanical and thermal properties of the inaccessible asset, as well as any identifying information of the inaccessible asset and smart-sensing RFID patch. The method 400 can continue at 408 with emitting, via the antennae of the smart-sensing RFID patch, a backscattering signal (e.g., the backscattering signal 214) that includes the transformed signal generated at 406, and any sensor signals therein. The backscattering signal can be emitted from the smart-sensing RFID patch and antennae back in the direction of the GPR trolley to be received and post-processed. As such, the method 400 can continue at 410 with receiving, via a GPR receiver (e.g., the GPR receiver 216) of the GPR trolley, the backscattering signal that includes the signals of the MEMS sensors denoting the health of the buried asset. The backscattering signal can include at least the transformed signal from a single smart-sensing RFID patch, but can further include a transformed signal from each smart-sensing RFID patch in an array of smart-sensing RFID patches (e.g., the 3-patch belt 302 or 5-patch belt 306).

The method 400 can further include analyzing, via a computing device (e.g., the computing device 218), the received backscattering signal at 412. The analysis at 412 can include extracting the status or health of the inaccessible asset from the backscattering signal, thus parsing the signals of the MEMS sensors to obtain readouts of the mechanical and thermal properties of the inaccessible asset and smart-sensing RFID patch, as well as any identifying information of the inaccessible asset and any smart-sensing RFID patches thereon. In some embodiments, the method 400 can further include conveying the GPR trolley along a length of the inaccessible asset to obtain backscattering signals from each of the smart-sensing RFID patches distributed thereon, such that the overall health or status of the inaccessible asset can be monitored. Accordingly, the method 400 can enable the remote monitoring of the health of an inaccessible asset, without the need to excavate or extract the inaccessible asset from its installed location.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 5:
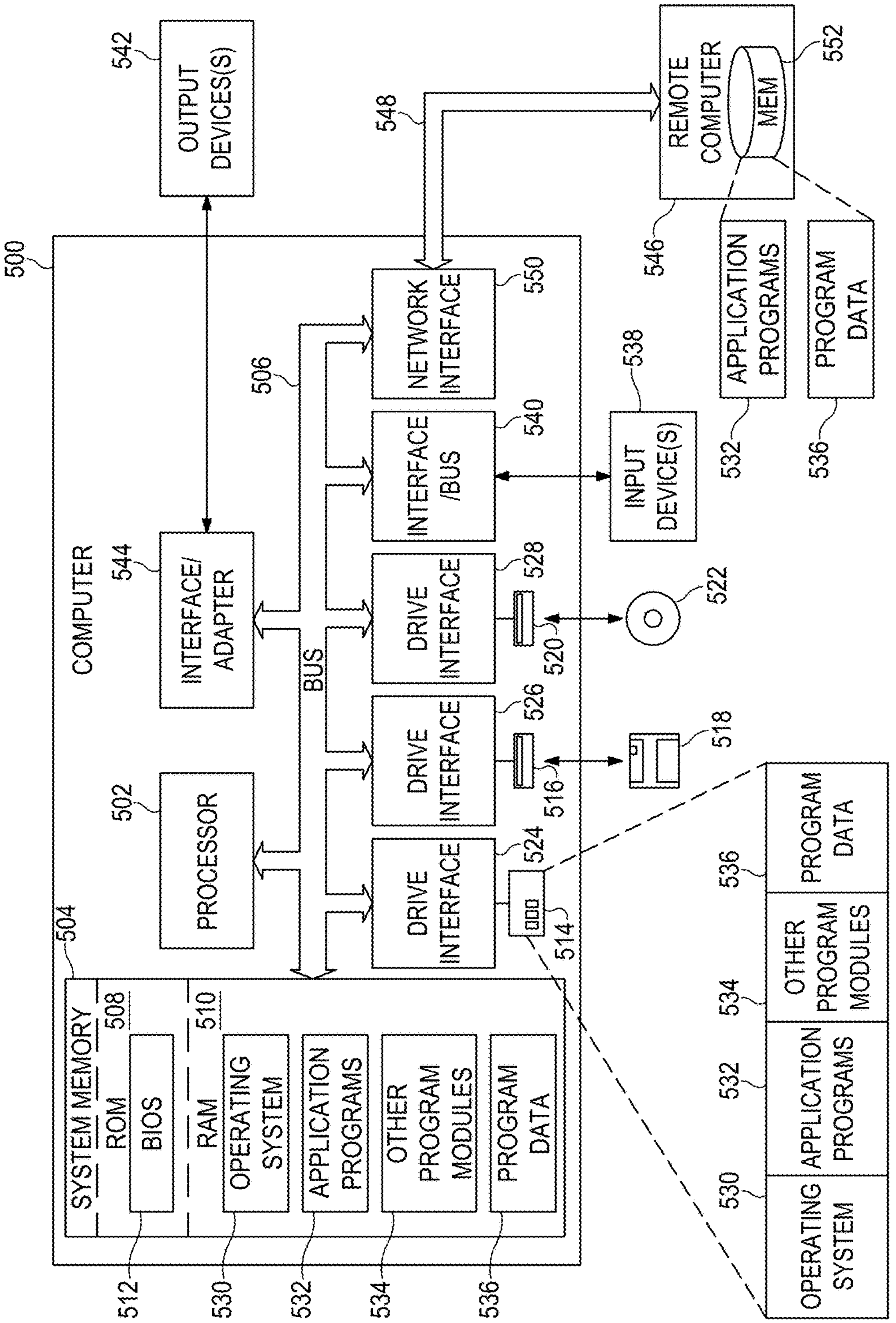
FIG. 5 illustrates one example of a computer system that can be employed to execute one or more embodiments of the present disclosure

In this regard, FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. In some embodiments, computer system 500 can represent computing device 218 of the system 200. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. System memory 504 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 502. System bus 506 may be any of several types of bus structure including a memory bus or memory controller, a peripheral bus, and a local bus using any of a variety of bus architectures. System memory 504 includes read only memory (ROM) 508 and random access memory (RAM) 510. A basic input/output system (BIOS) 512 can reside in ROM 508 containing the basic routines that help to transfer information among elements within computer system 500.

Computer system 500 can include a hard disk drive 514, magnetic disk drive 516, e.g., to read from or write to removable disk 518, and an optical disk drive 520, e.g., for reading CD-ROM disk 522 or to read from or write to other optical media. Hard disk drive 514, magnetic disk drive 516, and optical disk drive 520 are connected to system bus 506 by a hard disk drive interface 524, a magnetic disk drive interface 526, and an optical drive interface 528, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and ROM 508, including operating system 530, one or more application programs 532, other program modules 534, and program data 536. In some examples, the application programs 532 can include the signal transformer of the integrated circuit 104, the post-processing programs of the computing device 218, and emission and receiving programs of the GPR trolley 206, and the program data 536 can include any of the identifying information of the smart-sensing RFID patch 100, the readings of the MEMS sensors, and the backscattering signal 214. The application programs 532 and program data 536 can include functions and methods programmed for the remote monitoring of inaccessible assets, such as shown and described herein.

A user may enter commands and information into computer system 500 through one or more input device 538, such as a pointing device (e.g., a mouse, touch screen), keyboard, microphone, joystick, game pad, scanner, and the like. These and other input devices 538 are often connected to processing unit 502 through a corresponding port interface 540 that is coupled to the system bus, but may be connected by other interfaces, such as a parallel port, serial port, or universal serial bus (USB). One or more output devices 542 (e.g., display, a monitor, printer, projector, or other type of displaying device) is also connected to system bus 506 via interface 544, such as a video adapter.

Computer system 500 may operate in a networked environment using logical connections to one or more remote computers, such as remote computer 546. Remote computer 546 may be a workstation, computer system, router, peer device, or other common network node, and typically includes many or all the elements described relative to computer system 500. The logical connections, schematically indicated at 548, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 500 can be connected to the local network through a network interface or adapter 550. When used in a WAN networking environment, computer system 500 can include a modem, or can be connected to a communications server on the LAN. The modem, which may be internal or external, can be connected to system bus 506 via an appropriate port interface. In a networked environment, application programs 532 or program data 536 depicted relative to computer system 500, or portions thereof, may be stored in a remote memory storage device 552.

Embodiments disclosed herein include:

A. A smart-sensing radio frequency identification (RFID) patch for assessing a status of an inaccessible asset, the smart-sensing RFID patch comprising a flexible substrate operable to bend or flex to be secured about an exterior surface of the inaccessible asset, an integrated circuit embedded within the flexible substrate and communicably coupled to a plurality of electrical connections, a plurality of micro-electromechanical systems (MEMS) sensors communicably coupled to one or more of the electrical connections, the MEMS sensors operable to output signals denoting the status of the inaccessible asset, and one or more antennae communicably coupled to one or more of the electrical connections, wherein the antennae are operable to receive a high-power signal from an external source and emit a backscattering signal including the signals output by the MEMS sensors.

B. A system for assessing a status of an inaccessible asset, the system comprising a smart-sensing radio frequency identification (RFID) patch including an integrated circuit, an antenna, and one or more micro-electromechanical systems (MEMS) sensors arranged on a flexible substrate, the smart-sensing RFID patch coupled to an inaccessible asset, and a ground-penetrating radar (GPR) trolley including a conveyance means for traversing a ground in the vicinity of an inaccessible asset, a GPR emitter operable to emit a high-power signal receivable by the smart-sensing RFID patch, and a GPR receiver operable to receive a backscattering signal emitted by the smart-sensing RFID patch and including signals indicating the status of the inaccessible asset.

C. A method for assessing a status of an inaccessible asset, the method comprising conveying, via a conveyance means, a ground-penetrating radar (GPR) trolley along a ground surface in the vicinity of the inaccessible asset, emitting, via a GPR emitter of the GPR trolley, a high-power signal towards the inaccessible asset and a smart-sensing radio frequency identification (RFID) patch mounted thereon, transforming, via an integrated circuit and micro-electromechanical systems (MEMS) sensors of the smart-sensing RFID patch, the high-power signal to include signals of the MEMS sensors denoting the status of the inaccessible asset, emitting, via the smart-sensing RFID patch, a backscattering signal including the signals of the MEMS sensors towards the GPR trolley, receiving, via a GPR receiver of the GPR trolley, the backscattering signal including the signals of the MEMS sensors denoting the status of the inaccessible asset, and analyzing, via a computing device, the backscattering signal received by the GPR receiver to extract the status of the inaccessible asset from the backscattering signal.

Each of embodiments A through C may have one or more of the following additional elements in any combination: Element 1: wherein the high-power signal is a ground penetrating radar (GPR) signal with sufficient power to penetrate mediums with dielectric factors of about 10 or greater. Element 2: wherein the MEMS sensors include one or more capacitance MEMS patterns operable to sense mechanical and thermal variations of the flexible substrate and inaccessible asset. Element 3: wherein MEMS sensors include one or more straight resistance MEMS patterns operable to sense property variations of the flexible substrate and inaccessible asset selected from the group consisting of stresses, strains, pressures, deformations, and any combination thereof. Element 4: wherein the MEMS sensors include one or more spiral resistance MEMS patterns operable to sense thermal variations of the flexible substrate and inaccessible asset. Element 5: further comprising a degradable connector embedded within one or more of the electrical connections, the degradable connector operable to degrade and disconnect the electrical connections upon contacting a specified chemical or chemical type, reaching a pre-determined duration of time, meeting specific environmental conditions, or any combination thereof.

Element 6: further comprising at least three sets of integrated circuits, pluralities of MEMS sensors, and antennae arranged in series on a single flexible substrate. Element 7: wherein the flexible substrate is wrapped around the exterior surface of the inaccessible asset, and wherein each set is operable to receive the high-power signal from the external source at varying locations. Element 8: wherein the GPR trolley further includes a computing device mounted to the GPR trolley and operable to analyze the backscattering signal to determine the status of the inaccessible asset. Element 9: wherein the computing device further includes a display operable to visualize the status of the inaccessible asset for viewing by an operator. Element 10: wherein the MEMS sensors includes one or more patterns selected from the group consisting of capacitance MEMS patterns, straight resistance MEMS patterns, spiral resistance MEMS patterns, and any combination thereof. Element 11: wherein the smart-sensing RFID patch further includes: a plurality of electrical connections interposing the integrated circuit, the antenna, and the MEMS sensors; and a degradable connector embedded within one or more electrical connections and operable to degrade and disconnect the electrical connections upon contacting a specified chemical or chemical type, reaching a pre-determined duration of time, meeting specific environmental conditions, or any combination thereof.

Element 12: wherein the smart-sensing RFID patch includes at least three sets of integrated circuits, MEMS sensors, and antennae arranged in series on a single flexible substrate. Element 13: wherein the flexible substrate is wrapped around the exterior surface of the inaccessible asset, and wherein each set is operable to receive the high-power signal from the GPR emitter at varying locations on the ground surface. Element 14: further comprising additional smart-sensing RFID patches mounted to the exterior surface of the inaccessible asset at distance intervals along the inaccessible asset, such that the GPR trolley assesses the status of the inaccessible asset at varying locations along the inaccessible asset. Element 15: wherein the MEMS sensors are operable to detect changes in properties of the inaccessible asset selected from the group consisting of stresses, strains, vibrations, temperatures, heat fluxes, pressures, and any combination thereof. Element 16: further comprising: mounting a plurality of smart-sensing RFID patch at distance intervals along the inaccessible asset; and conveying the GPR trolley along a length of the inaccessible asset to receive a backscattering signal from each smart-sensing RFID patch, and to assess an overall health of the inaccessible asset across multiple locations. Element 17: wherein the smart-sensing RFID patch includes least three sets of integrated circuits, pluralities of MEMS sensors, and antennae arranged in series on a single flexible substrate, wherein the flexible substrate is wrapped around the inaccessible asset, and wherein the GPR trolley receives the backscattering signal at a variety of locations around the inaccessible asset.

By way of non-limiting example, exemplary combinations applicable to A through C include: Element 6 with Element 7; Element 8 with Element 9; and Element 12 with Element 13.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A smart-sensing radio frequency identification (RFID) patch for assessing a status of an inaccessible asset, the smart-sensing RFID patch comprising:

a flexible substrate operable to bend or flex to be secured about an exterior surface of the inaccessible asset;

an integrated circuit embedded within the flexible substrate and communicably coupled to a plurality of electrical connections;

a plurality of micro-electromechanical systems (MEMS) sensors communicably coupled to one or more of the electrical connections, the MEMS sensors operable to output signals denoting the status of the inaccessible asset; and one or more antennae communicably coupled to one or more of the electrical connections, wherein the antennae are operable to receive a high-power signal from an external source and emit a backscattering signal including the signals output by the MEMS sensors.

2. The smart-sensing RFID patch of claim 1, wherein the high-power signal is a ground penetrating radar (GPR) signal with sufficient power to penetrate mediums with dielectric factors of about 10 or greater.

3. The smart-sensing RFID patch of claim 1, wherein the MEMS sensors include one or more capacitance MEMS patterns operable to sense mechanical and thermal variations of the flexible substrate and inaccessible asset.

4. The smart-sensing RFID patch of claim 1, wherein MEMS sensors include one or more straight resistance MEMS patterns operable to sense property variations of the flexible substrate and inaccessible asset selected from the group consisting of stresses, strains, pressures, deformations, and any combination thereof.

5. The smart-sensing RFID patch of claim 1, wherein the MEMS sensors include one or more spiral resistance MEMS patterns operable to sense thermal variations of the flexible substrate and inaccessible asset.

6. The smart-sensing RFID patch of claim 1, further comprising a degradable connector embedded within one or more of the electrical connections, the degradable connector operable to degrade and disconnect the electrical connections upon contacting a specified chemical or chemical type, reaching a pre-determined duration of time, meeting specific environmental conditions, or any combination thereof.

7. The smart-sensing RFID patch of claim 1, further comprising at least three sets of integrated circuits, pluralities of MEMS sensors, and antennae arranged in series on a single flexible substrate.

8. The smart-sensing RFID patch of claim 7, wherein the flexible substrate is wrapped around the exterior surface of the inaccessible asset, and wherein each set is operable to receive the high-power signal from the external source at varying locations.

9. A system for assessing a status of an inaccessible asset, the system comprising:

a smart-sensing radio frequency identification (RFID) patch including an integrated circuit, an antenna, and one or more micro-electromechanical systems (MEMS) sensors arranged on a flexible substrate, the smart-sensing RFID patch coupled to an inaccessible asset; and a ground-penetrating radar (GPR) trolley including:

a conveyance means for traversing a ground in the vicinity of an inaccessible asset;

a GPR emitter operable to emit a high-power signal receivable by the smart-sensing RFID patch; and a GPR receiver operable to receive a backscattering signal emitted by the smart-sensing RFID patch and including signals indicating the status of the inaccessible asset.

10. The system of claim 9, wherein the GPR trolley further includes a computing device mounted to the GPR trolley and operable to analyze the backscattering signal to determine the status of the inaccessible asset.

11. The system of claim 10, wherein the computing device further includes a display operable to visualize the status of the inaccessible asset for viewing by an operator.

12. The system of claim 9, wherein the MEMS sensors includes one or more patterns selected from the group consisting of capacitance MEMS patterns, straight resistance MEMS patterns, spiral resistance MEMS patterns, and any combination thereof.

13. The system of claim 9, wherein the smart-sensing RFID patch further includes:

a plurality of electrical connections interposing the integrated circuit, the antenna, and the MEMS sensors; and a degradable connector embedded within one or more electrical connections and operable to degrade and disconnect the electrical connections upon contacting a specified chemical or chemical type, reaching a predetermined duration of time, meeting specific environmental conditions, or any combination thereof.

14. The system of claim 9, wherein the smart-sensing RFID patch includes at least three sets of integrated circuits, MEMS sensors, and antennae arranged in series on a single flexible substrate.

15. The system of claim 14, wherein the flexible substrate is wrapped around the exterior surface of the inaccessible asset, and wherein each set is operable to receive the high-power signal from the GPR emitter at varying locations on the ground surface.

16. The system of claim 9, further comprising additional smart-sensing RFID patches mounted to the exterior surface of the inaccessible asset at distance intervals along the inaccessible asset, such that the GPR trolley assesses the status of the inaccessible asset at varying locations along the inaccessible asset.

17. The system of claim 9, wherein the MEMS sensors are operable to detect changes in properties of the inaccessible asset selected from the group consisting of stresses, strains, vibrations, temperatures, heat fluxes, pressures, and any combination thereof.

18. A method for assessing a status of an inaccessible asset, the method comprising:

conveying, via a conveyance means, a ground-penetrating radar (GPR) trolley along a ground surface in the vicinity of the inaccessible asset;

emitting, via a GPR emitter of the GPR trolley, a high-power signal towards the inaccessible asset and a smart-sensing radio frequency identification (RFID) patch mounted thereon;

transforming, via an integrated circuit and micro-electro-mechanical systems (MEMS) sensors of the smart-sensing RFID patch, the high-power signal to include signals of the MEMS sensors denoting the status of the inaccessible asset;

emitting, via the smart-sensing RFID patch, a backscattering signal including the signals of the MEMS sensors towards the GPR trolley;

receiving, via a GPR receiver of the GPR trolley, the backscattering signal including the signals of the MEMS sensors denoting the status of the inaccessible asset; and analyzing, via a computing device, the backscattering signal received by the GPR receiver to extract the status of the inaccessible asset from the backscattering signal.

19. The method of claim 18, further comprising:

mounting a plurality of smart-sensing RFID patch at distance intervals along the inaccessible asset; and conveying the GPR trolley along a length of the inaccessible asset to receive a backscattering signal from each smart-sensing RFID patch, and to assess an overall health of the inaccessible asset across multiple locations.

20. The method of claim 18, wherein the smart-sensing RFID patch includes least three sets of integrated circuits, pluralities of MEMS sensors, and antennae arranged in series on a single flexible substrate, wherein the flexible substrate is wrapped around the inaccessible asset, and wherein the GPR trolley receives the backscattering signal at a variety of locations around the inaccessible asset.

* * * * *